US011200713B2

(12) United States Patent
Gupta

(10) Patent No.: US 11,200,713 B2
(45) Date of Patent: Dec. 14, 2021

(54) SYSTEMS AND METHODS FOR ENHANCING VISION

(71) Applicant: Amitabha Gupta, Toronto (CA)

(72) Inventor: Amitabha Gupta, Toronto (CA)

(73) Assignee: Amitabha Gupta, Toronto (CA)

( * ) Notice: Subject to any disclaimer, the term of this patent is extended or adjusted under 35 U.S.C. 154(b) by 142 days.

(21) Appl. No.: 16/595,028

(22) Filed: Oct. 7, 2019

(65) Prior Publication Data

US 2020/0111240 A1 Apr. 9, 2020

Related U.S. Application Data

(60) Provisional application No. 62/741,884, filed on Oct. 5, 2018.

(51) Int. Cl.
*G06T 11/20* (2006.01)
*G06T 7/13* (2017.01)
*G06T 5/00* (2006.01)
*G02B 27/01* (2006.01)

(52) U.S. Cl.
CPC ........ *G06T 11/203* (2013.01); *G02B 27/0172* (2013.01); *G06T 5/008* (2013.01); *G06T 7/13* (2017.01); *G02B 2027/014* (2013.01); *G02B 2027/0132* (2013.01); *G02B 2027/0138* (2013.01); *G02B 2027/0141* (2013.01)

(58) Field of Classification Search
None
See application file for complete search history.

(56) References Cited

U.S. PATENT DOCUMENTS

| 6,271,808 | B1 * | 8/2001 | Corbin | G02B 27/0172 345/7 |
| 2010/0014773 | A1 * | 1/2010 | Ito | H04N 5/142 382/266 |
| 2010/0302355 | A1 * | 12/2010 | Tamaru | H04N 13/128 348/59 |
| 2011/0227910 | A1 * | 9/2011 | Ying | A61B 6/482 345/419 |

(Continued)

*Primary Examiner* — Saptarshi Mazumder
(74) *Attorney, Agent, or Firm* — Rowand LLP

(57) ABSTRACT

A method for enhancing a user's vision is disclosed. The method includes: obtaining a first image corresponding to a left viewpoint of a scene and a second image corresponding to a right viewpoint of the scene; identifying a first central region of the first image corresponding to a central visual field of the user's left eye and a second central region of the second image corresponding to a central visual field of the user's right eye; applying a first image transformation to one of the first central region and a first peripheral region surrounding the first central region to obtain a first transformed image, wherein applying the first image transformation to a region of an image includes: detecting contours of objects in the region; generating graphical indications of the detected contours of the objects; and modifying the image to include the graphical indications; applying the first image transformation to one of the second central region and a second peripheral region surrounding the second central region to obtain a transformed second image; combining the transformed first and second images to obtain a third image; displaying the third image on a near-eye display.

16 Claims, 5 Drawing Sheets

(56) References Cited

U.S. PATENT DOCUMENTS

2013/0044290 A1* 2/2013 Kawamura ............ A61B 3/032
                                                          351/201
2018/0214006 A1* 8/2018 Akimoto ................ A61B 5/062

* cited by examiner

SYSTEMS AND METHODS FOR ENHANCING VISION

TECHNICAL FIELD

The present disclosure relates to low vision care and, in particular, to systems and methods for providing electronically augmented images to enhance vision for patients suffering from low vision.

BACKGROUND

Low vision refers to a state of reduced vision which cannot be corrected with medical treatment, surgery, or conventional glasses and contact lenses. Common causes of low vision include macular degeneration, diabetic retinopathy, glaucoma, cataracts, and eye injuries. Low vision is often characterized by partial vision, visual field loss (e.g. blind spots, tunnel vision), or legal blindness. People suffering from low vision experience significant difficulty with everyday tasks, such as general mobility and reading.

Various low vision aids are known. Low vision optical devices, such as stand or handheld-magnifiers, magnifying reading glasses, clip-on loupes and spectacle-mounted telescopes, can provide increased magnification powers and prescription strengths as well as higher-quality optics. These devices are usually task-specific, and different devices may be prescribed for different tasks.

Generic low vision aids are often ineffective in combatting the symptoms of complex eye diseases, such as retinitis pigmentosa (RP), end-stage glaucoma (ESG), and Stargardt's disease (DS). In particular, diseases which cause permanent loss of central or peripheral vision are difficult to manage using conventional low vision devices.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a computer-implemented method for enhancing a user's vision. The method includes: obtaining a first image corresponding to a left viewpoint of a scene and a second image corresponding to a right viewpoint of the scene; identifying a first central region of the first image corresponding to a central visual field of the user's left eye and a second central region of the second image corresponding to a central visual field of the user's right eye; applying a first image transformation to one of the first central region and a first peripheral region surrounding the first central region to obtain a first transformed image, wherein applying the first image transformation to a region of an image includes: detecting contours of objects in the region; generating graphical indications of the detected contours of the objects; and modifying the image to include the graphical indications; applying the first image transformation to one of the second central region and a second peripheral region surrounding the second central region to obtain a transformed second image; combining the transformed first and second images to obtain a third image; displaying the third image on a near-eye display.

In another aspect, the present disclosure describes a computing device for enhancing a user's vision. The computing device includes memory, a near-eye display, and a processor coupled to the memory and the near-eye display. The processor is configured to: obtain a first image corresponding to a left viewpoint of a scene and a second image corresponding to a right viewpoint of the scene; identify a first central region of the first image corresponding to a central visual field of the user's left eye and a second central region of the second image corresponding to a central visual field of the user's right eye; apply a first image transformation to one of the first central region and a first peripheral region surrounding the first central region to obtain a first transformed image, wherein applying the first image transformation to a region of an image includes: detecting contours of objects in the region; generating graphical indications of the detected contours of the objects; and modifying the image to include the graphical indications; apply the first image transformation to one of the second central region and a second peripheral region surrounding the second central region to obtain a transformed second image; combine the transformed first and second images to obtain a third image; display the third image on a near-eye display.

Other example embodiments of the present disclosure will be apparent to those of ordinary skill in the art from a review of the following detailed descriptions in conjunction with the drawings.

Figure 1:
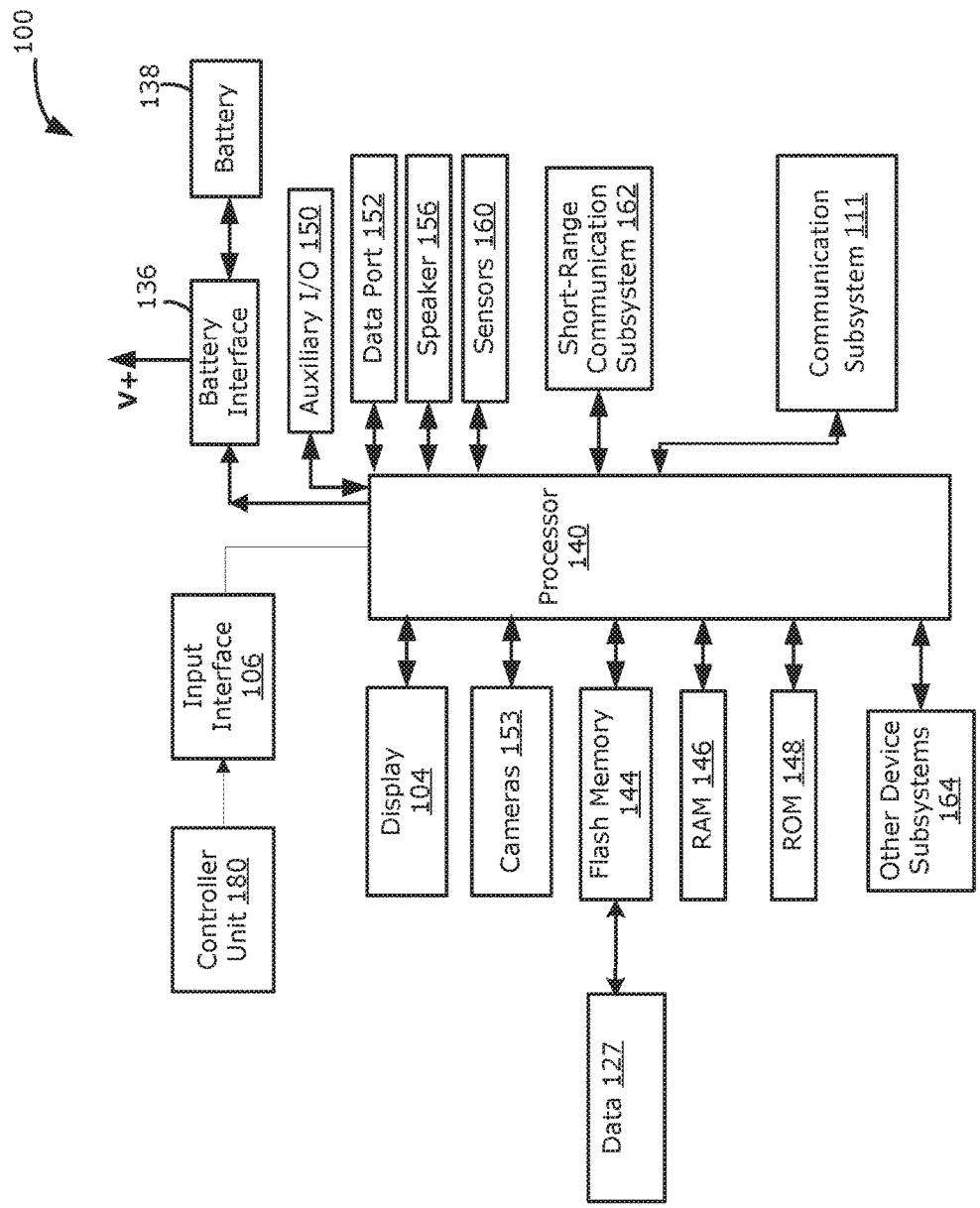
FIG. 1 is a block diagram illustrating components of a head-mounted display, in accordance with example embodiments of the present disclosure.

Reference is first made to FIG. 1, which shows a block diagram illustrating components of an example head-mounted display (HMD) 100 in accordance with embodiments of the present disclosure. The HMD 100 is configured to be worn on a user's head and includes at least one display optic which is viewable by the user when the HMD 100 is worn. The display optic associated with the HMD 100 may provide displays of electronically generated images and/or videos for viewing by a user of the HMD 100. In at least some embodiments, the HMD 100 may implement an augmented vision system for use by visually impaired persons. The HMD 100 may adapt various image enhancement techniques to generate augmented images of real world environments which can be seen by persons with low vision. In particular, the HMD 100 may be configured to process images of a user's surroundings in real-time and apply digital enhancements to the images which are appropriate for the particular visual impairments experienced by the user.

In some embodiments, the HMD 100 may be an optical head-mounted display (OMHD). That is, the HMD 100 may reflect projected images while also allowing a user to see through the display. For example, various notifications, text, and images may be superimposed on a real world view using the HMD 100. As a result, the HMD 100 may be suitable for providing, for example, immersive and/or mobile augmented reality.

The HMD 100 includes a housing which houses components of the HMD 100. The housing of the HMD is configured to be worn on a user's head. In particular, at least a portion of the housing may be shaped to generally conform to the contour of a user's face, allowing it to be comfortably secured to the user's head when the HMD 100 is in use. Internal components of the HMD 100 may be constructed on a printed circuit board (PCB). The HMD 100 includes a controller including at least one processor 140 (such as a microprocessor) which controls the overall operation of the HMD 100. The processor 140 interacts with device subsystems such as a wireless communication subsystem 111 for exchanging radio frequency signals with an external wireless network to perform communication functions. The processor 140 interacts with additional device subsystems including one or more input interfaces 106, flash memory 144, random access memory (RAM) 146, read only memory (ROM) 148, auxiliary input/output (I/O) subsystems 150, a data port 152 (which may be a serial data port, such as a Universal Serial Bus (USB) data port), one or more output interfaces (such as display units 104, which may be liquid crystal displays (LCD), one or more speakers 156, or other output interfaces), a short range communication module 162, and other device subsystems generally designated as 164. Some of the subsystems shown in FIG. 1 perform communication-related functions, whereas other subsystems may provide "resident" or on-device functions.

The HMD 100 includes one or more display units 104. The display units 104 display images for viewing by a user of the HMD 100. The display units 104 are mounted in an interior chamber defined by the housing and are directly viewable when the HMD 100 is worn by a user. In particular, the display units 104 are positioned within the housing such that the display units 104 are disposed directly in front of the user's eyes when the HMD 100 is suitably mounted on the user's head during use. In some embodiments, the display unit 104 may comprise a single display screen centrally positioned within the housing. In other embodiments, two separate display screens may be provided, with a display screen disposed in front of each of a user's left and right eyes. For example, two display screens 104 may be mounted in the interior of the housing and positioned in laterally spaced relation to each other such that the centers of the display screens 104 are separated by an appropriate distance (e.g. mean inter-pupillary distance, ranging from approximately 50 millimeters to 70 millimeters). The display screens may use any one of Organic Light Emitting Diode (OLED), Liquid Crystal on Silicon (LCS), virtual retinal display (VRD), or Liquid Crystal Display (LCD) technologies. The display screens may comprise arrays of a plurality of curved mirrors. In some embodiments, the display units 104 may be disposed on an inner surface of the front cover. For example, the display units 104 may comprise screens that are built in to the inner surface of the front cover such that the screens are positioned opposite a user's eyes during use of the HMD 100. Alternatively, the display units 104 may be suspended inside the housing in spaced relation to the inner surface of the front cover.

The processor 140 interacts with the display units 104 and is configured to transmit data for display by the display units 104. In particular, the processor 140 may transmit image and/or video data to the display units 104 for display to a user of the HMD 100. For example, if the display unit 104 comprises two display screens, the processor 140 may generate and provide separate images for each of the display screens. As will be described further below, the images provided to the respective display screens may comprise left and right eye views of a user's real world environment, seen using the HMD 100.

The communication subsystem 111 includes a receiver, a transmitter, and associated components, such as one or more antenna elements, local oscillators, and a processing module such as a digital signal processor (DSP). The antenna elements may be embedded or internal to the HMD 100 and a single antenna may be shared by both receiver and transmitter. The particular design of the wireless communication subsystem 111 depends on the external wireless network in which the HMD may be configured to operate.

In some embodiments, the auxiliary I/O subsystems 150 may include an external communication link or interface such as, for example, an Ethernet connection. The HMD 100 may include other wireless communication interfaces for communicating with other types of wireless networks; for example, a wireless network such as an orthogonal frequency division multiplexed (OFDM) network.

The HMD 100 may store data 127 in an erasable persistent memory which, in one example embodiment, is the flash memory 144. The data 127 may include user profile information and user preferences with respect to image display settings, such as magnification level and image enhancement and control modes (e.g. brightness, contrast, etc.). The data 127 may, in some embodiments, include metadata storing information about images generated and/or displayed using the HMD 100. The metadata and the images may be stored together or separately. The data 127 may also include such information as device identification data, usage history, and profiles of connected devices.

The data port 152 may be used for synchronizing the HMD 100 with one or more external computer systems. The data port 152 enables a user to set preferences through an external device or software application and extends the capabilities of the HMD 100 by providing for information or software downloads to the HMD 100 other than through an external wireless network. For example, the processor 140 of the HMD 100 may receive image and/or video data for display on the display units 104 via wired USB connections to external devices, such as a computer or camera. In at least some embodiments, the HMD 100 may be synchronized wirelessly with external systems and devices, for example, via the communication subsystem 111 and/or the short range communication module 162.

The HMD 100 includes a battery 138 as a power source, which is typically one or more rechargeable batteries that may be charged, for example, through charging circuitry coupled to a battery interface 136. The battery 138 provides electrical power to at least some of the electrical circuitry in the HMD 100, and the battery interface 136 provides a mechanical and electrical connection for the battery 138. The battery interface 136 is coupled to a regulator (not shown) which provides power V+ to the circuitry of the HMD 100.

The short range communication module 162 provides for communication between the HMD 100 and different systems or devices. For example, the short range communication module 162 may include an infrared device and associated circuits and components, or a wireless bus protocol compliant communication mechanism such as a Bluetooth® communication module to provide for communication with similarly-enabled systems and devices.

The HMD 100 may include one or more cameras 153. The cameras 153 are capable of acquiring camera data such as images in the form of still photographs and/or motion video. The camera data may be captured in the form of an electronic signal which is produced by an image sensor. In at least some embodiments, the HMD 100 includes two cameras 153 configured to capture left and right viewpoint images of a real world scene. That is, a first camera of the HMD 100 may capture an image corresponding to a left eye view of a scene and a second camera of the HMD 100 may capture an image corresponding to a right eye view of the same scene. As a result, the cameras 153 may provide suitable images for generating binocular views of a scene. In some other embodiments, the HMD 100 may include a single camera 153. For example, a camera 153 that is centrally disposed in the HMD 100 may be configured to capture images which may be displayed as single images or which may be digitally modified to generate two different images (i.e. left and right images) for presentation to the respective eyes of a user. The captured images may also be modified non-digitally; for example, a camera view may be split into a left and right view using various arrangements of mirrors and/or prisms.

The cameras 153 are mounted in the housing and are front-facing. That is, the cameras 153 are mounted in such a manner that, when the HMD 100 is worn by the user, the cameras 153 are directed to scenes in front of the user. In at least some embodiments, the cameras 153 may be integrated into the front cover. For example, the front cover may be at least partially translucent and allow sufficient light to enter image sensors associated with cameras 153 positioned inside the front cover. As another example, the cameras 153 may be embedded into the front cover such that the lens covering the image sensors of the cameras 153 are substantially flush with an outer surface of the front cover. The cameras 153 may alternatively be mounted directly on the outer surface of the front cover.

In some embodiments, each camera 153 may be coupled to an actuator or motor for electrically displacing the camera 153 with respect to the housing. The actuator or motor may be controlled by signals provided by control circuitry of the HMD 100 or a remote control circuitry (e.g. an external device that is connected to the HMD 100). A user of the HMD 100 may manually control an actuator/motor to change the relative position or line of sight of an associated camera, or the actuator/motor may be engaged automatically in response to predetermined triggers (e.g. detection of eye movement via gaze tracking).

The cameras 153 may be coupled directly with the processor 140 which controls the cameras. In some embodiments, the cameras 153 may include dedicated image signal processors which may provide at least some camera-related functions. For example, an image signal processor of camera 153 may be configured to provide, among others, auto-focusing, sensitivity and brightness control, or magnification functions. Various functions and features of a dedicated camera application or software module may, in some embodiments, be provided, in whole or in part, by an image signal processor.

The HMD 100 may also include one or more on-board sensors 160. For example, the HMD 100 may include a gyroscope and/or an accelerometer. The HMD 100 may also include eye- or gaze-tracking sensors/cameras for measuring the motion of eyes relative to a user's head and the direction or point of gaze. For example, one or more infrared-sensitive cameras may be mounted in the interior of the housing to track movement of a user's eyes based on known techniques, such as corneal-reflection-based eye tracking. In at least some embodiments, the HMD 100 includes a thermometer and/or a hygrometer inside the housing. The sensors can include proximity sensors and 3D scanners to detect the scene in front of the user. They can also include sensors to detect if the device is being worn, for example to perform auto-sleep or shutdown if the device is not being worn. The sensors may also monitor one eye or both eye positions and viewing angle of the screen. That is, sensors may be provided in the HMD 100 for measuring the temperature or moisture content in the interior space of housing.

The present application describes techniques for providing electronically augmented images that can be used to enhance vision for people with low vision or vision loss. More specifically, systems and methods are described for processing and digitally augmenting images of scenes that are viewed by a person in order to facilitate enhanced visibility of the scenes by the person. The images of a scene are processed and transformed in a manner that accounts for specific visual impairments experienced by a person. For example, one or more digital filters may be applied to images of a scene that is viewed by a person. The digital filters may be customized according to parameters relating to the person's vision, such as measures of their central and peripheral visual field. More generally, the transformation of images of a scene to enhance visibility of the scene for a person may depend on the specific type, degree, location, etc. of visual impairments experienced by the person. The transformations may be controlled either automatically (e.g. according to predefined rules or thresholds) or manually (e.g. by a doctor, patient, etc. based on visual field test rules).

A visual field test can detect dysfunction in central and peripheral vision. In particular, a visual field test shows functional areas and areas of vision loss or scotomas. Results from conventional testing show scotomas (i.e. areas of poor vison) in black, indicating areas with inability to see a standardized light source. Doctors generally assume that there is no useful vision in these areas, and use terms such as "absolute scotoma" to describe such areas.

Figure 4A:
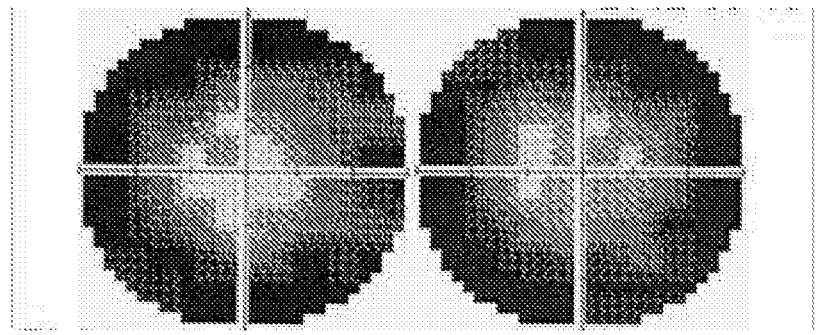
FIGS. 4A and 4B show example results of visual field tests for persons suffering from RP and ESG, respectively.
Figure 4B:
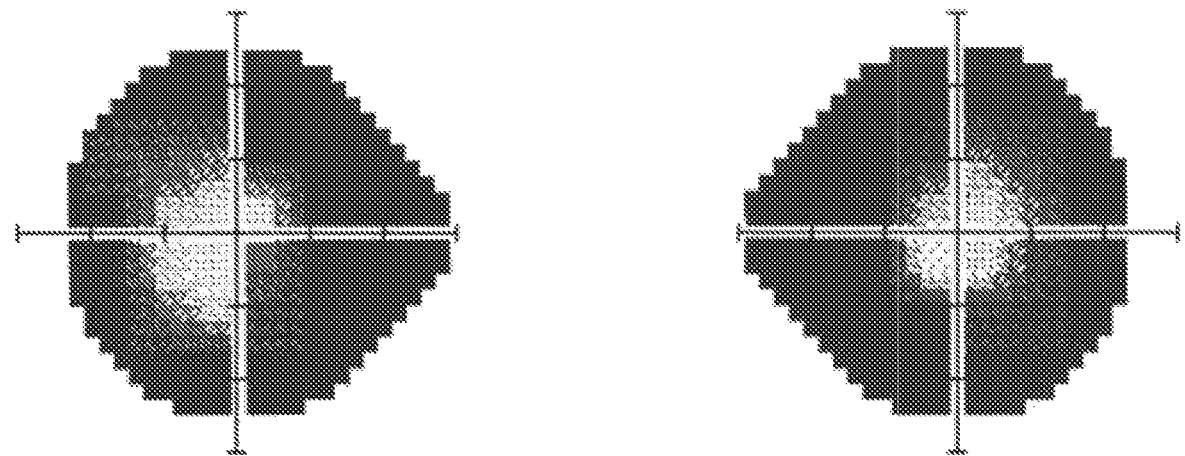

In retinitis pigmentosa (RP) and end-stage glaucoma (ESG), a small amount of central retina is functional, but the peripheral retina shows loss of sensitivity to light. Visual field testing shows a central white area associated with working vision, surrounded by a dark ring associated with undetectable vision (i.e. vision below a threshold of detection). These results are illustrated in FIGS. 4A and 4B. Multifocal electroretinogram (mERG), which is a technique for identifying regions of the retina that respond to light, may reveal that there is some light detection in the "dark" areas.

For patients with RP or ESG, their working central visual field may function as well as a normal person's vision; however, to be able to use their remaining central vision, higher contrast and better lighting may be required. People with "tunnel vision" (e.g. RP, ESG) will typically navigate by moving their eyes to scan their surrounding environment, such as a room, and seeing small portions of scenes until they can assemble a full image in their mind's eye. This can be a slow and tedious process, and is often prone to error.

Techniques such as contrast enhancement, magnification, and minification have been proposed for remedying effects of tunnel vision, but are usually ineffective. For example, while magnification may allow a person to see greater amount of detail, it results in reduction in size of the visible visual field. Minification decreases the size of an image, such that a larger part of the image is visible in a person's central visual field creating an expansion of the person's visual field; however, minification may reduce the amount of detail visible to the person. Creating high contrast in images is similarly insufficient. In particular, while small amounts of color and contrast enhancement may improve the usability of a person's central visual field, they may not render the peripheral visual field any more useful.

Figure 2:
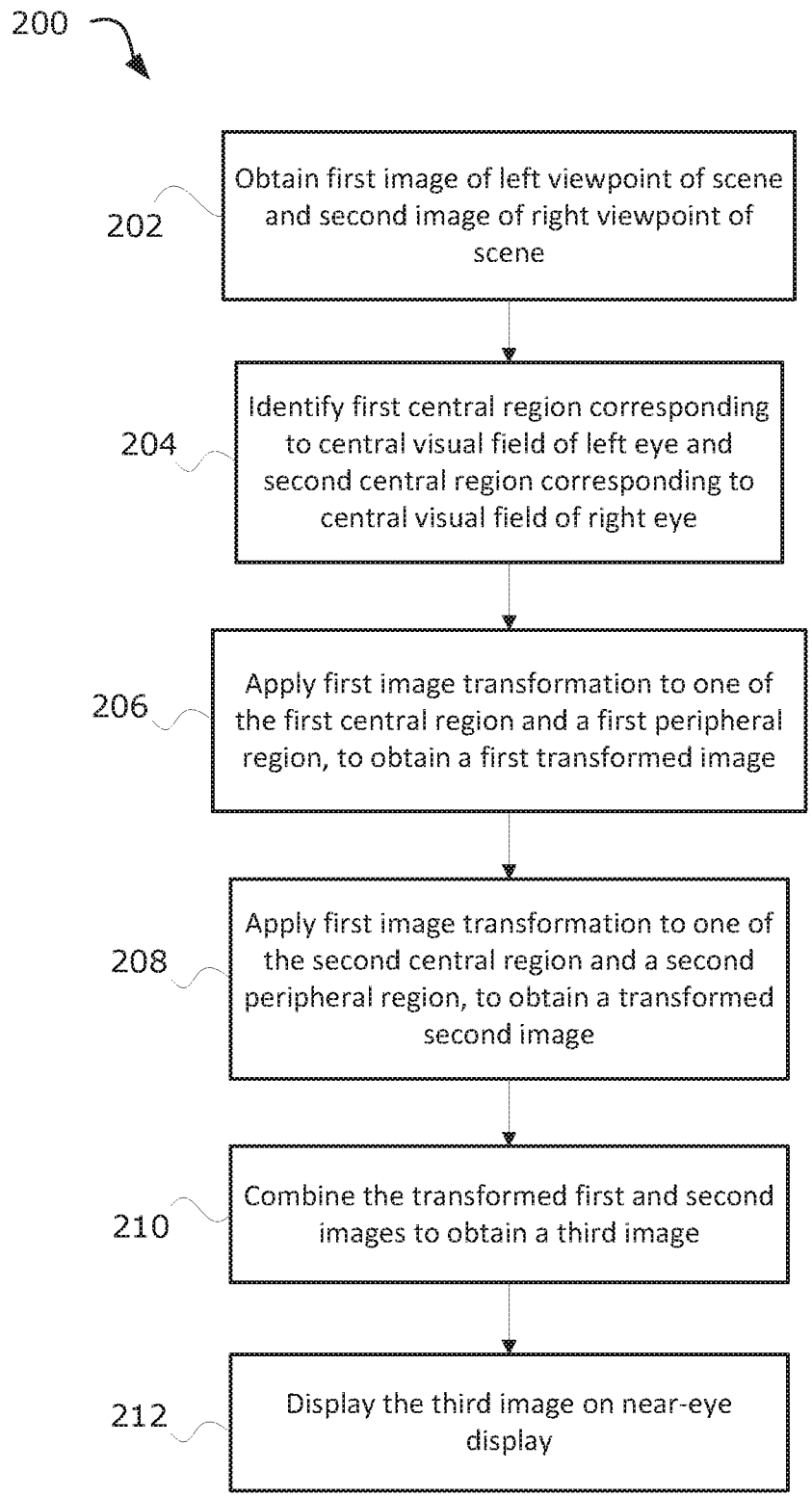
FIG. 2 show, in flowchart form, an example method for providing electronically augmented images.

Reference is made to FIG. 2, which shows an example method 200 for providing electronically augmented images of a scene. The method 200 may be used to enhance a user's vision. A computing device capable of obtaining, processing, and displaying image data, such as an HMD in accordance with example embodiments of the present disclosure, can be used to perform method 200. In particular, a computing device may be configured to process image data for images and digitally augment the images for presentation to a user, to assist in enhancing the user's vision.

Two separate imaging units (e.g. cameras) may be mounted in spaced relation to each other on the computing device. More specifically, a first imaging unit and a second imaging unit, which have overlapping fields of view, may be mounted on the computing device and directed towards scenes in front of a user wearing the computing device. The first imaging unit and the second imaging unit may be configured to capture a left viewpoint image and a right viewpoint image of a scene, respectively, as seen by a user of the computing device.

In at least some embodiments, one or more steps of method 200 are implemented by a processor of the computing device, such as processor 140 of FIG. 1. In particular, the processor of the computing device may be coupled to or include, at least, a first imaging unit, a second imaging unit, a first display unit and a second display unit. In some embodiments, the method 200 may be wholly or partly implemented by a processor of an external computing system that is communicatively coupled to a processor and/or display unit of the computing device.

In operation 202, a first image corresponding to a left viewpoint of a scene and a second image corresponding to a right viewpoint of the scene are obtained. The first image may be captured using a first camera and the second image may be captured using a second camera. The first image and the second image are captured substantially simultaneously; that is, the images are captured by the first and second cameras, respectively, at or nearly at the same time. In at least some embodiments, the fields of view of the first camera and the second camera are greater than the fields of view of the first display unit and the second display unit, respectively. The captured images may be stored in a memory associated with the computing device and/or transmitted directly to a processor of the computing device.

In operation 204, a first central region of the first image corresponding to a central visual field of the user's left eye and a second central region of the second image corresponding to a central visual field of the user's right eye are identified. That is, a region in the first image which corresponds to (e.g. location of) a user's working central visual field in their left eye is identified, and a region in the second image which corresponds to a user's working central visual field in their right eye is also identified. In some embodiments, visual field testing may be used to determine the size and location of the working central visual field in each eye independently. The visual field test result data may be mapped to the first and second images to identify the first central region of the first image and the second central region of the second image. For example, this mapping of the visual field size/location information to the first and second images may be done automatically to identify the first and second central regions. Area(s) of functional central vision can also be identified by manual or automated analysis of various retinal images (e.g. fundus photography, fundus autofluorescence, fluorescein angiography, ICG angiography, scanning laser ophthalmoscopy).

In operation 206, a first image transformation is applied to one of the first central region and a first peripheral region that surrounds the first central region. The first image transformation is a specific type of image processing/filter that is applied to a region in an image. In particular, the first image transformation may be an image enhancement or filter that is suitable for applying to images of a scene in order to assist in enhancing visibility of the scene for persons experiencing tunnel vision.

Figure 3:
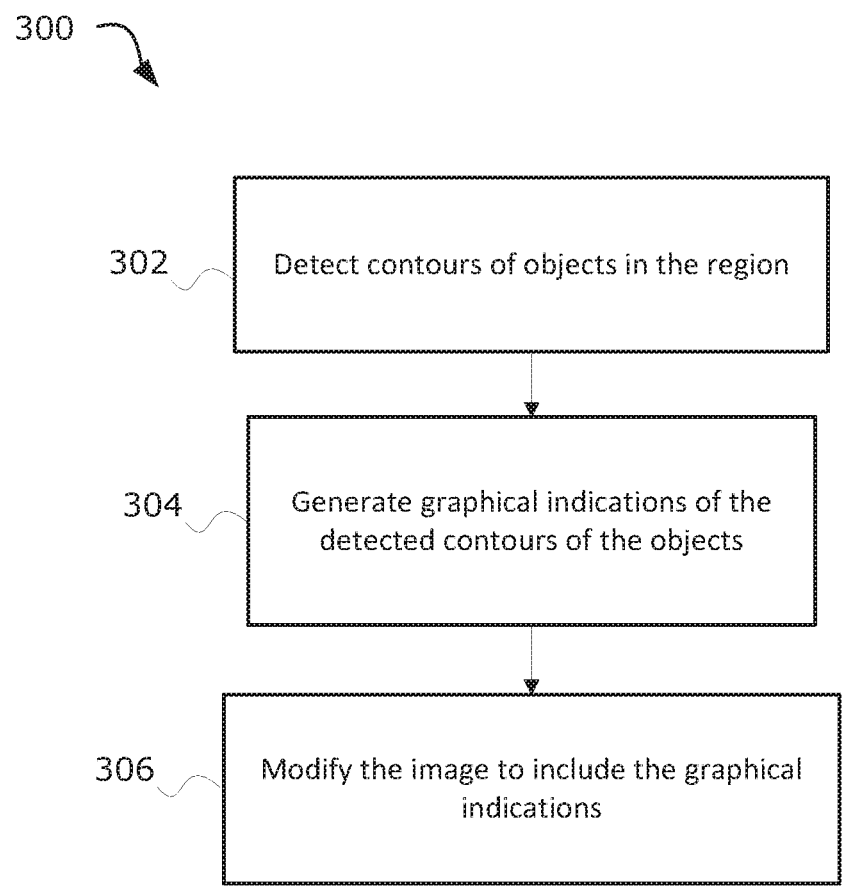
FIG. 3 shows, in flowchart form, another example method for providing electronically augmented images.

The first image transformation may be performed as a subroutine of method 200. This subroutine is shown as method 300 in FIG. 3. First, contours of objects in the specified region of the image are detected, in operation 302. For example, various known image recognition, contour matching, and object/edge detection algorithms may be employed to detect contours (or outlines) of objects that are depicted in the region of the scene. The computing device then generates graphical indications of the detected contours of the objects, in operation 304. The graphical indications may, for example, include solid contour lines for delineating contours of objects in the region of the scene. The contour lines may have a thickness that is greater than a predefined threshold, creating the effect of bolded outlines for objects. In operation 306, the computing system modifies the image to include the graphical indications. By way of example, the graphical indications, such as solid contour lines, may be overlaid on the detected contours of the objects in the region.

Figure 5A:
FIGS. 5A and 5B show examples of views of transformed images.
Figure 5B:

In some embodiments, applying the first image transformation to a region of an image may further include converting the region to grayscale, or black-and-white. That is, the first image transformation may result in the application of an enhancement or filter that converts a specific region of an image to grayscale and contains graphical indications (e.g. solid contour lines) of the contours of detected objects in the region. FIG. 5A shows an example of a high-contrast, transformed image that includes bold lines corresponding to contours of objects in a first image of a scene. FIG. 5B shows an example view of the image of 5A that is seen by a person with tunnel vision. With the bold contour lines, a person with poor peripheral vision may still see outlines of objects, with the transformed image providing context for orientation and navigation.

In some embodiments, the first image transformation is applied to the first and second peripheral regions. In other words, only the peripheral regions of the first and second images may be affected by the first image transformation. This method may be appropriate for patients dealing with RP or ESG, whose central visual field is functional and visibility in the peripheral region may be enhanced by means of applying the first image transformation.

If the first image transformation is applied to the peripheral regions, the thickness of contour lines that are used to graphical indicate outlines of objects may increase as distance of the contour lines from the central regions increases. Vision loss in the peripheral field is often graduated, being better near the center and worse in the far periphery. To accommodate this phenomenon, applying the first image transformation may include increasing the thickness of the contour lines as distance from the visual field center increases. This effect may allow for higher contrast, due to thicker contour lines, in those regions of an image where visibility is likely to be lower for people suffering from RP or ESG.

Alternatively, the first image transformation may be applied to the first and second central regions. This technique may be suitable for enhancing vision of persons suffering from Stargardt's disease. In Stargardt's disease, the visual field is inverted—the central vision is poor but the periphery remains intact. The peripheral visual field may be color and contrast enhanced, while the first image transformation, including use of high contrast solid contour lines, may be applied to the central visual field.

For both the RP/ESG and Stargardt's disease scenarios, the region of the first and second images that do not undergo the first image transformation may be altered. In particular, a second image transformation, such as magnification, minification, brightness and color modifications, and/or other local contrast enhancement transforms, may be applied to the part of the first and second image that is not treated with the filter/effect of high contrast contour lines. Magnification, minification, brightness and color modifications, and/or other local contrast enhancement transforms may also be applied to the image as a whole—both the central and peripheral visual field, keeping the whole image proportional.

In operation 210, the transformed first and second images are combined to obtain a third image. The third image is the image that results from applying the first image transformation (e.g. high contrast outlines) to either the central regions or the peripheral regions of the first and second images corresponding to the left and right viewpoints, respectively, of a scene. As described above, the third image may be further processed to apply a second image transformation for the region of the first (and second) image that does not receive the first image transformation (i.e. high contrast graphical indication of contours). In operation 212, the third image is displayed on a near-eye display, such as a display of an HMD. This third image may represent an enhanced version of the left and right viewpoint images of a scene that is viewed by a person with low vision or vision loss. In some embodiments, the transformed first and second images may be displayed separately on displays for left and right eyes, respectively, of a user on the computing device.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer-implemented method for enhancing a user's vision,
the method comprising:
obtaining a first image corresponding to a left viewpoint of a scene and a second image corresponding to a right viewpoint of the scene;
identifying a first central region of the first image corresponding to a central visual field of the user's left eye and a second central region of the second image corresponding to a central visual field of the user's right eye;
applying a first image transformation to one of the first central region and a first peripheral region surrounding the first central region to obtain a first transformed image, wherein applying the first image transformation to a region of an image includes:
detecting contours of objects in the region;
generating graphical indications of the detected contours of the objects,
the graphical indications including solid contour lines delineating contours of the objects; and
modifying the image to include the graphical indications;
applying the first image transformation to one of the second central region and a second peripheral region surrounding the second central region to obtain a transformed second image;
combining the transformed first and second images to obtain a third image;
displaying the third image on a near-eye display,
wherein the first image transformation is applied to the first and second peripheral regions and wherein a thickness of the contour lines increases as distance of the contour lines from the central region increases.

2. The method of claim 1, wherein applying the first image transformation to a region of an image further comprises converting the region to grayscale.

3. The method of claim 1, wherein the first image transformation is applied to the first and second central regions.

4. The method of claim 1, wherein a thickness of contour lines is greater than a predefined threshold value.

5. The method of claim 1, wherein modifying the image to include the graphical indications comprises overlaying the graphical indications on the detected contours of the objects.

6. The method of claim 1, further comprising:
applying a second image transformation to the other of the first central region and the first peripheral region; and
applying the second image transformation to the other of the second central region and the second peripheral region.

7. The method of claim 6, wherein applying the second image transformation to a region of an image includes applying a local contrast enhancement transform to the region.

8. The method of claim 1, further comprising:
receiving input of results from a visual field test; and
determining sizes and locations of the central visual field of the user's left and right eyes based on the input.

9. A computing device for enhancing a user's vision, comprising:
memory;
a near-eye display; and
a processor coupled to the memory and the near-eye display, the processor being configured to:
obtain a first image corresponding to a left viewpoint of a scene and a second image corresponding to a right viewpoint of the scene;
identify a first central region of the first image corresponding to a central visual field of the user's left eye and a second central region of the second image corresponding to a central visual field of the user's right eye;
apply a first image transformation to one of the first central region and a first peripheral region surrounding the first central region to obtain a first transformed image, wherein applying the first image transformation to a region of an image includes:
  detecting contours of objects in the region;
  generating graphical indications of the detected contours of the objects, the graphical indications including solid contour lines delineating contours of the objects; and
  modifying the image to include the graphical indications;
apply the first image transformation to one of the second central region and a second peripheral region surrounding the second central region to obtain a transformed second image;
combine the transformed first and second images to obtain a third image;
display the third image on a near-eye display,
wherein the first image transformation is applied to the first and second peripheral regions and wherein a thickness of the contour lines increases as distance of the contour lines from the central region increases.

10. The computing device of claim 9, wherein applying the first image transformation to a region of an image further comprises converting the region to grayscale.

11. The computing device of claim 9, wherein the first image transformation is applied to the first and second central regions.

12. The computing device of claim 9, wherein a thickness of contour lines is greater than a predefined threshold value.

13. The computing device of claim 9, wherein a thickness of contour lines is greater than a predefined threshold value.

14. The computing device of claim 9, wherein the processor is further configured to:
  apply a second image transformation to the other of the first central region and the first peripheral region; and
  apply the second image transformation to the other of the second central region and the second peripheral region.

15. The computing device of claim 14, wherein applying the second image transformation to a region of an image includes applying a local contrast enhancement transform to the region.

16. The computing device of claim 9, wherein the processor is further configured to:
  receive input of results from a visual field test; and
  determine sizes and locations of the central visual field of the user's left and right eyes based on the input.

* * * * *